US012798062B2

(12) United States Patent
Chan

(10) Patent No.: US 12,798,062 B2
(45) Date of Patent: Nov. 17, 2026

(54) TORQUE STRUCTURE

(71) Applicant: Rong-Suei Chan, Taipei City (TW)

(72) Inventor: Rong-Suei Chan, Taipei City (TW)

( * ) Notice: Subject to any disclaimer, the term of this patent is extended or adjusted under 35 U.S.C. 154(b) by 300 days.

(21) Appl. No.: 18/818,394

(22) Filed: Aug. 28, 2024

(65) Prior Publication Data

US 2026/0061576 A1 Mar. 5, 2026

(51) Int. Cl.
*B25B 23/142* (2006.01)
*B25B 13/46* (2006.01)
*B25B 23/00* (2006.01)

(52) U.S. Cl.
CPC .......... *B25B 23/1427* (2013.01); *B25B 13/46* (2013.01); *B25B 23/0014* (2013.01)

(58) Field of Classification Search
CPC ... B25B 13/46; B25B 23/142; B25B 23/1422; B25B 23/1425; B25B 23/1427
See application file for complete search history.

(56) References Cited

U.S. PATENT DOCUMENTS

| | | | | |
|---|---|---|---|---|
| 4,641,538 A * | 2/1987 | Heyraud | B25B 23/1425 | 73/862.26 |
| 6,968,759 B2 * | 11/2005 | Becker | B25B 23/1425 | 81/479 |
| 6,981,436 B2 * | 1/2006 | Becker | B25B 23/1425 | 81/479 |
| 8,171,828 B2 * | 5/2012 | Duvan | B25B 23/1425 | 73/862.27 |
| 8,770,071 B2 * | 7/2014 | Chang | B25B 13/463 | 81/173 |
| 8,844,381 B2 * | 9/2014 | Gharib | B25B 23/1425 | 81/479 |
| 10,625,405 B2 * | 4/2020 | Silha | B25B 21/004 | |
| 11,565,388 B2 * | 1/2023 | Hsieh | B25B 23/1425 | |
| 11,766,770 B2 * | 9/2023 | Silha | B25B 21/004 | 81/52 |
| 12,447,592 B2 * | 10/2025 | Anjanappa | G01L 5/24 | |
| 2010/0256929 A1 * | 10/2010 | Gharib | B25B 23/1425 | 702/41 |
| 2012/0132042 A1 * | 5/2012 | Bruce | B25B 23/1425 | 81/479 |
| 2013/0249700 A1 * | 9/2013 | Hsieh | B25B 23/1425 | 340/665 |
| 2015/0013475 A1 * | 1/2015 | Gharib | B25B 23/1425 | 73/862.21 |
| 2022/0048168 A1 * | 2/2022 | Vizachero | B25B 23/1425 | |
| 2022/0347822 A1 * | 11/2022 | Locatelli | B25B 23/1425 | |
| 2022/0395969 A1 * | 12/2022 | Boccellato | B25B 23/1425 | |

* cited by examiner

*Primary Examiner* — David B. Thomas
(74) *Attorney, Agent, or Firm* — LANWAY IPR SERVICES; Chun-Ming Shih

(57) ABSTRACT

A torque structure includes a first body, a first strain gauge, a second strain gauge, and a second body unit. The first body is provided with a first receiving groove. The first strain gauge detects a bending strain of t he first body. The second strain gauge detects a torque deformation amount of the first body. The second body unit includes a second body, an indicator, a housing, and a power supply member. The second body is provided with a second receiving groove and a slot. The indicator is mounted in the slot and provided with a switch, a first push button, and a second push button. The indicator is electrically connected with the first strain gauge and the second strain gauge. The housing and the power supply member are received in the second receiving groove.

7 Claims, 10 Drawing Sheets

TORQUE STRUCTURE

BACKGROUND OF THE INVENTION

Field of the Invention

The present invention relates to a hand operated tool and, more particularly, to a torque structure.

Description of the Related Art

A conventional powered ratcheting torque wrench was disclosed in the U.S. Pat. No. 10,625,405, and comprises a main housing 12, an electric motor 18, a motor drive shaft 20, a drive assembly 22, an output assembly 24, and a transducer assembly 118. The main housing 12 has a grip 13. The drive assembly 22 is coupled to the motor drive shaft 20 and driven by the electric motor 18. The output assembly 24 is coupled to the drive assembly 22 and has an output member 102 driven by a torque from the drive assembly 22. Thus, the output member 102 is revolved about an axis A. The transducer assembly 118 is mounted between the electric motor 18 and the output assembly 24.

However, such a conventional powered ratcheting torque wrench has the following disadvantages.

1. The grip 13 of the main housing 12 is driven to measure a torque applied on the torque wrench. Thus, the conventional powered ratcheting torque wrench only has a single detecting function.
2. The output assembly 24 is assembled with the transducer assembly 118. Then, the transducer assembly 118 is assembled with the gear housing 36 of the drive assembly 22. Then, the gear housing 36 is secured with the main housing 12. Thus, the assemblies have to be assembled in series, so that the conventional powered ratcheting torque wrench has a poor structure of assembly.

BRIEF SUMMARY OF THE INVENTION

The primary objective of the present invention is to provide a torque structure having two different detecting functions to detect a bending strain and a torque deformation.

In accordance with the present invention, there is provided a torque structure comprising a first body, a first strain gauge, a second strain gauge, a second body unit, and multiple fastening members. The first body is provided with a first receiving groove, a first mounting portion, and a first axis. The first strain gauge is received in the first receiving groove to detect a bending strain in response to a bending force applied to the first body. The second strain gauge is received in the first receiving groove to detect a torque deformation amount of the first body. The second body unit includes a second body, an indicator, a housing, a power supply member, a grip, and a cover. The second body is provided with a second receiving groove, a first opening, a second opening, and a slot. The indicator is mounted in the slot and provided with a switch, a first push button, and a second push button. The indicator is electrically connected with the first strain gauge and the second strain gauge. The housing and the power supply member are received in the second receiving groove.

According to the primary advantages of the present invention, the first receiving groove accommodates the first strain gauge and the second strain gauge. The first strain gauge detects the bending strain of the first body. The second strain gauge detects the torque deformation amount of the first body. Thus, the first strain gauge and the second strain gauge provides two different detecting functions to enhance the utility of the torque structure.

According to another advantage of the present invention, When the driving portion is perpendicular to the drive member or when the driving portion is in line with the drive member, the torque structure can be used to detect the two different torque values, so that the user needs not to purchase a torque wrench and a torque screwdriver simultaneously for detecting two different torque values, thereby enhancing the versatility of the torque structure.

According to a further advantage of the present invention, when the drive member is a ratchet mechanism, the second axis is perpendicular to the first axis, and when the drive member is a screwdriver connector, the second axis coincides with the first axis. Thus, the torque value of the drive members of two different types can be detected.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
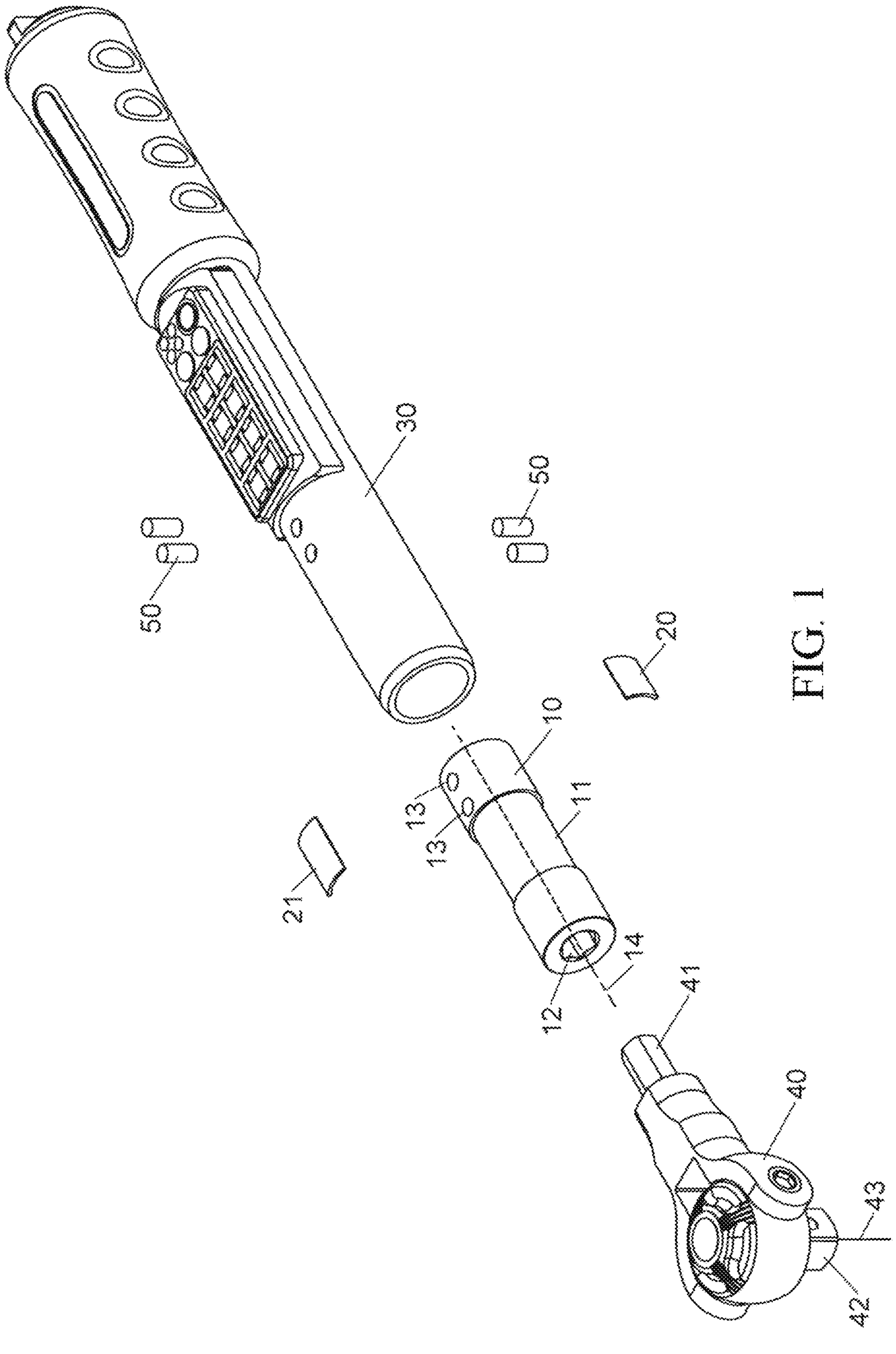
FIG. 1 is an exploded perspective view of a torque structure in accordance with the preferred embodiment of the present invention.
Figure 2:
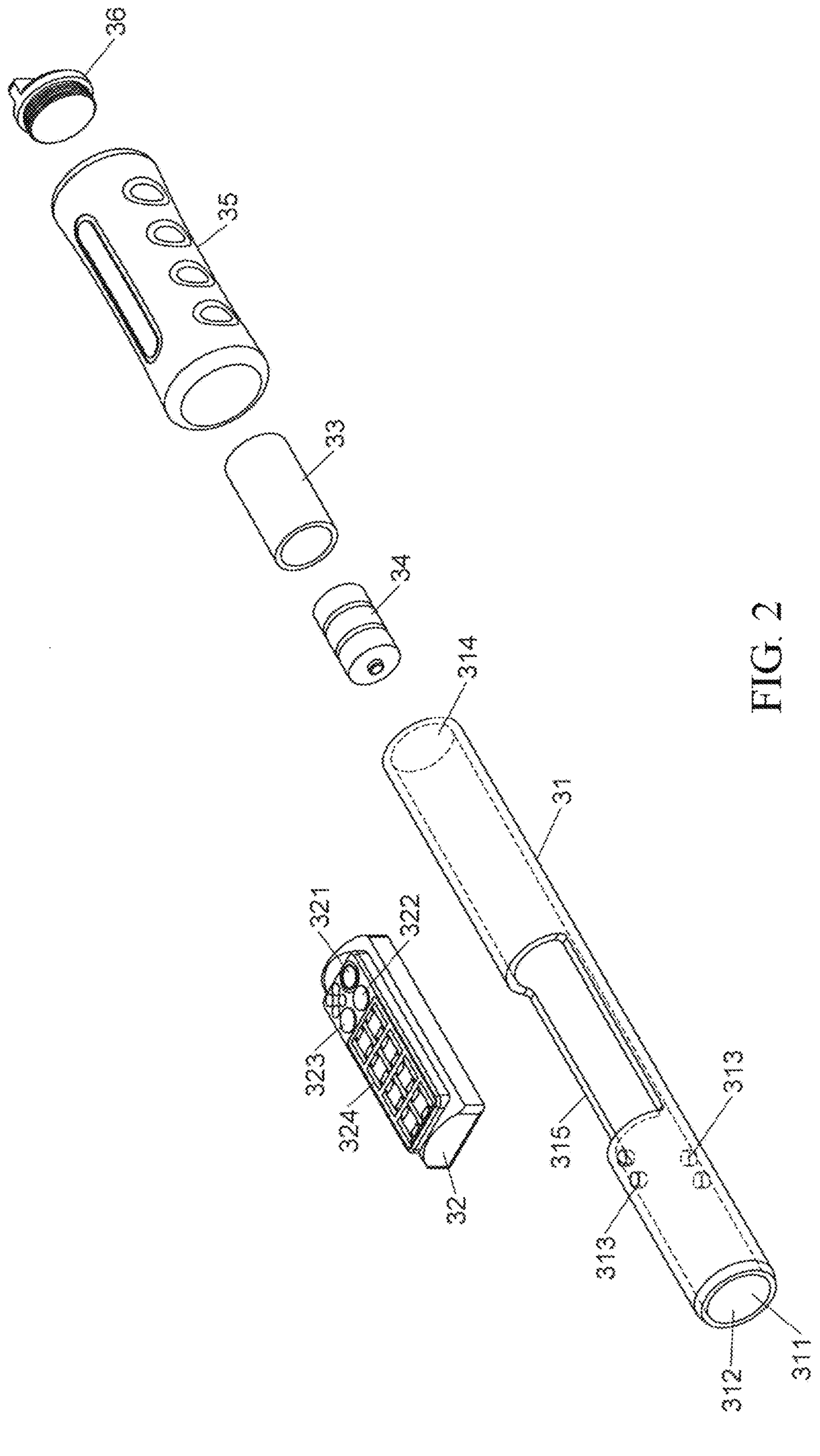
FIG. 2 is an exploded perspective view of a second body unit of the torque structure in accordance with the preferred embodiment of the present invention.

Referring to the drawings and initially to FIGS. 1-8, a torque structure in accordance with the preferred embodiment of the present invention comprises a first body 10, a first strain gauge 20, a second strain gauge 21, a second body unit 30, and multiple fastening (or fixing or securing) members 50.

The first body 10 is recessed with a first receiving groove 11. The first receiving groove 11 is formed in an exterior of the first body 10 and located at a middle position of the first body 10. The first body 10 is a circular rod. The first receiving groove 11 has an annular shape and has a diameter less than that of the first body 10. The first body 10 has a first end provided with a first mounting portion 12. The first mounting portion 12 is a hexagonal, polygonal or non-circular recess. The first body 10 has a second end provided with multiple first fastening (or fixing or securing) portions 13. Preferably, the first body 10 has four first fastening portions 13 arranged symmetrically. Each of the first fastening portions 13 is a circular hole or screw hole. Any two of the first fastening portions 13 are connected and penetrate the first body 10. The first receiving groove 11 is disposed between the first mounting portion 12 and the first fastening portions 13. The first mounting portion 12 and the first fastening portions 13 are disposed at two ends of the first receiving groove 11. The first body 10 has an axis defining a first axis 14.

The first strain gauge 20 is received in the first receiving groove 11 to detect a bending strain in response to a bending force applied to the first body 10. The bending strain of the first body 10 detected by the first strain gauge 20 is directed in a direction perpendicular to the first axis 14.

The second strain gauge 21 is received in the first receiving groove 11 to detect a torque (or torsion) deformation amount of the first body 10. The torque deformation amount of the first body 10 detected by the second strain gauge 21 is directed in a direction in line with the first axis 14. The bending strain of the first body 10 detected by the first strain gauge 20 and the torque deformation amount of the first body 10 detected by the second strain gauge 21 are different torque values. The second strain gauge 21 is perpendicular to the first strain gauge 20.

The second body unit 30 includes a second body 31, an indicator (or a display or a monitor) 32, a housing 33, a power supply member 34, a grip 35, and a cover 36. The first body 10, the first strain gauge 20, and the second strain gauge 21 are received in the second body unit 30. The first mounting portion 12 is exposed from the second body 31.

The second body 31 is a circular rod. The second body 31 is provided with a second receiving groove 311 for receiving and securing the first body 10. The second receiving groove 311 is a circular hollow recess and penetrates the second body 31 longitudinally. The second body 31 has a first end provided with a first opening 312, and the first body 10 is received in the first opening 312. The second body 31 is provided with multiple second fastening (or fixing or securing) portions 313 aligning with the first fastening portions 13. Preferably, the second body 31 has four second fastening portions 313. Each of the second fastening portions 313 is a circular hole and is close to the first opening 312. The second body 31 has a second end provided with a second opening 314. The second body 31 is provided with a slot 315 connected to the second receiving groove 311. The slot 315 has a rectangular shape. The slot 315 is disposed between to the first opening 312 and the second opening 314. The second fastening portions 313 are disposed between the first opening 312 and the slot 315.

The indicator 32 is mounted in the slot 315. The indicator 32 is provided with a switch 321 for controlling on/off of the indicator 32. The indicator 32 is provided with a first push button 322 and a second push button 323. The first push button 322 turns on/off the first strain gauge 20 to detect the bending strain of the first body 10. The second push button 323 turns on/off the second strain gauge 21 to detect the torque deformation amount of the first body 10. The indicator 32 is provided with multiple numbers 324 to indicate values of the bending strain of the first body 10 detected by the first strain gauge 20 and values of the torque deformation amount of the first body 10 detected by the second strain gauge 21.

The indicator 32 is electrically connected with the first strain gauge 20. The first strain gauge 20 detects and transmits the bending strain of the first body 10 to the indicator 32 so that the indicator 32 indicates the values of the bending strain of the first body 10. When a preset value of the bending strain of the first body 10 is reached, the indicator 32 emits a warning sound.

The indicator 32 is electrically connected with the second strain gauge 21. The second strain gauge 21 detects and transmits the torque deformation amount of the first body 10 to the indicator 32 so that the indicator 32 indicates the values of the torque deformation amount of the first body 10. When a preset value of the torque deformation amount of the first body 10 is reached, the indicator 32 emits a warning sound.

The housing 33 is received in the second receiving groove 311 and is close to the second opening 314.

The power supply member 34 is received in the housing 33 and can be removed from the housing 33. The power supply member 34 is electrically connected with and provides an electric power to the indicator 32. The power supply member 34 is a disposable battery or a chargeable battery.

The grip 35 is mounted on the second body 31. The grip 35 is close to the second opening 314 and distant from the first opening 312. The grip 35 is a hollow cylinder and has a periphery provided with multiple dimples to provide a non-slip effect.

The cover 36 is mounted on the second opening 314. The housing 33 and the power supply member 34 are restricted by the cover 36 and will not be detached from the second body 31. The cover 36 is provided with an external thread screwed into the second opening 314. The power supply member 34 is removed from the second body 31 after the cover 36 is detached from the second body 31.

Figure 4:
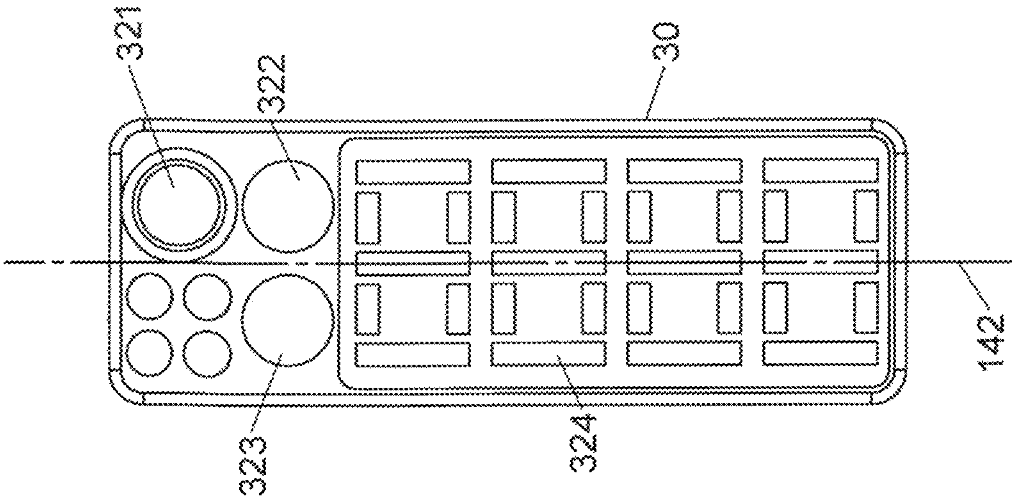
FIG. 4 is a top view of an indicator of the torque structure in accordance with the preferred embodiment of the present invention.
Figure 3:
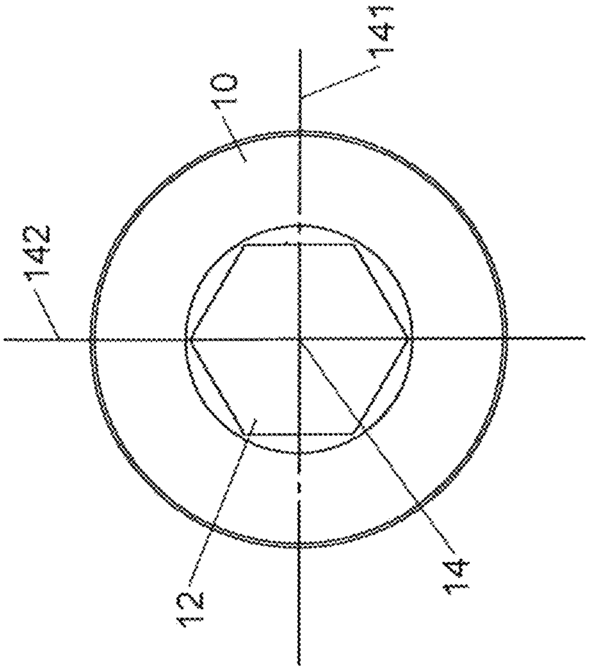
FIG. 3 is a front view of a first body of the torque structure in accordance with the preferred embodiment of the present invention.
Figure 5:
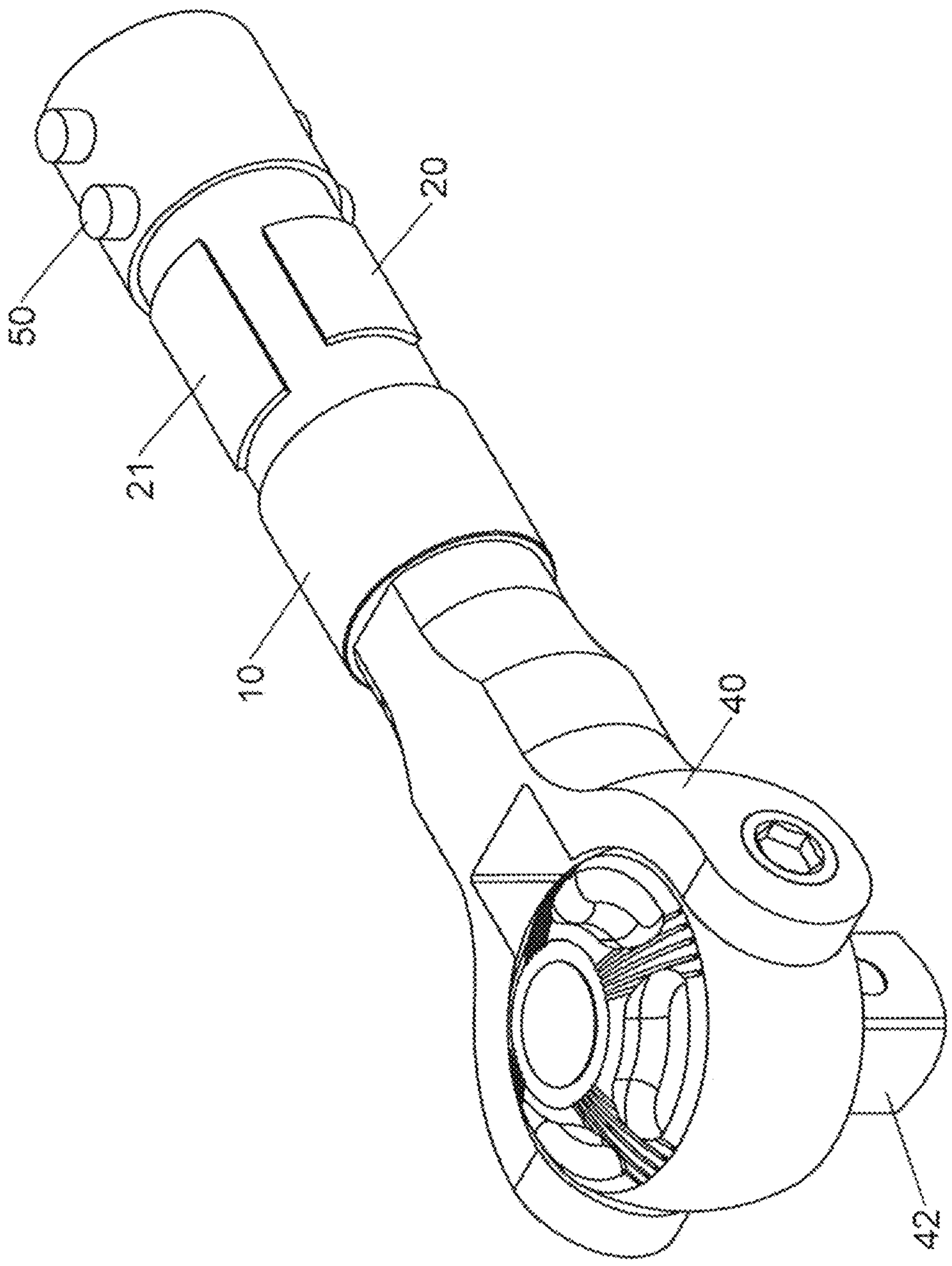
FIG. 5 is a partial perspective view of the torque structure in accordance with the preferred embodiment of the present invention.

Referring to FIGS. 3 and 4, the first axis 14 defines a first virtual surface 141 that is situated at an XY plane and defines a second virtual surface 142 that is situated at a YZ plane. The first virtual surface 141 is perpendicular to the second virtual surface 142. The first strain gauge 20 coincides with the first virtual surface 141. The second strain gauge 21 coincides with the second virtual surface 142. The first push button 322 is located at a right side of the second virtual surface 142. The second push button 323 is located at a left side of the second virtual surface 142. The first push button 322 is directed toward the first strain gauge 20. The second push button 323 is directed toward the second strain gauge 21.

The torque structure further comprises a drive member 40 having a first end provided with a second mounting portion 41 mounted on the first mounting portion 12. The second mounting portion 41 has a shape mating with that of the first mounting portion 12. The second mounting portion 41 is a hexagonal head. The drive member 40 has a second end provided with a driving portion 42 protruding from the first body 10. The driving portion 42 is a square head and has an axis defining a second axis 43. The driving portion 42 is rotatable relative to the drive member 40 and movable between a first position where the second axis 43 is perpendicular to the first axis 14 and intersect the first axis 14 at one point and a second position where the second axis 43 coincides with the first axis 14.

The fastening members 50 secure the first body 10 and the second body unit 30. The fastening members 50 extend through the second fastening portions 313 and the first fastening portions 13. The fastening members 50 have a number equal to that of the first fastening portions 13 and the second fastening portions 313.

In assembly, the first strain gauge 20 and the second strain gauge 21 are received in the first receiving groove 11. The first body 10 is received in the second receiving groove 311 and is assembled in the second body unit 30. The indicator 32 is electrically connected with the first strain gauge 20 and the second strain gauge 21. The second mounting portion 41 is mounted in the first mounting portion 12. The fastening members 50 in turn extend through the second fastening portions 313 and the first fastening portions 13 so that first body 10 is secured in the second body unit 30 and will not be detached from the second body unit 30.

Figure 8:
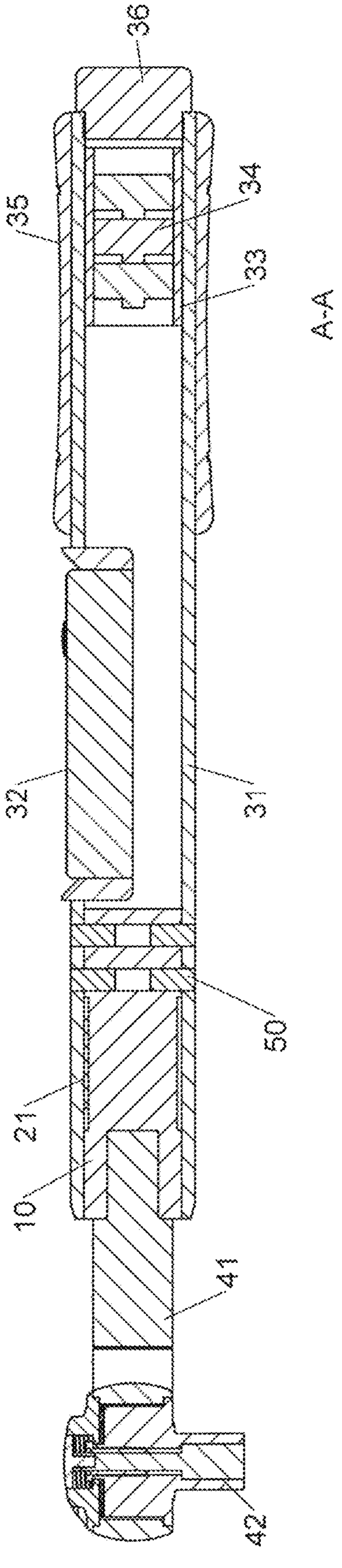
FIG. 8 is a cross-sectional view of the torque structure taken along line A-A as shown in FIG. 7.

In practice, referring to FIG. 8 with reference to FIGS. 1-7, the driving portion 42 is rotated relative to the drive member 40 and is moved to the first position where the second axis 43 is perpendicular to the first axis 14. At this time, the switch 321 is used to control the on/off state of the indicator 32. The first push button 322 turns on the first strain gauge 20 to detect the bending strain of the first body 10. Then, the driving portion 42 is further rotated relative to the drive member 40 and is moved to the second position where the second axis 43 coincides with the first axis 14. The second push button 323 turns on the second strain gauge 21 to detect the torque deformation amount of the first body 10. The numbers 324 indicate values of the bending strain of the first body 10 detected by the first strain gauge 20 and values of the torque deformation amount of t he first body 10 detected by the second strain gauge 21.

Figure 9:
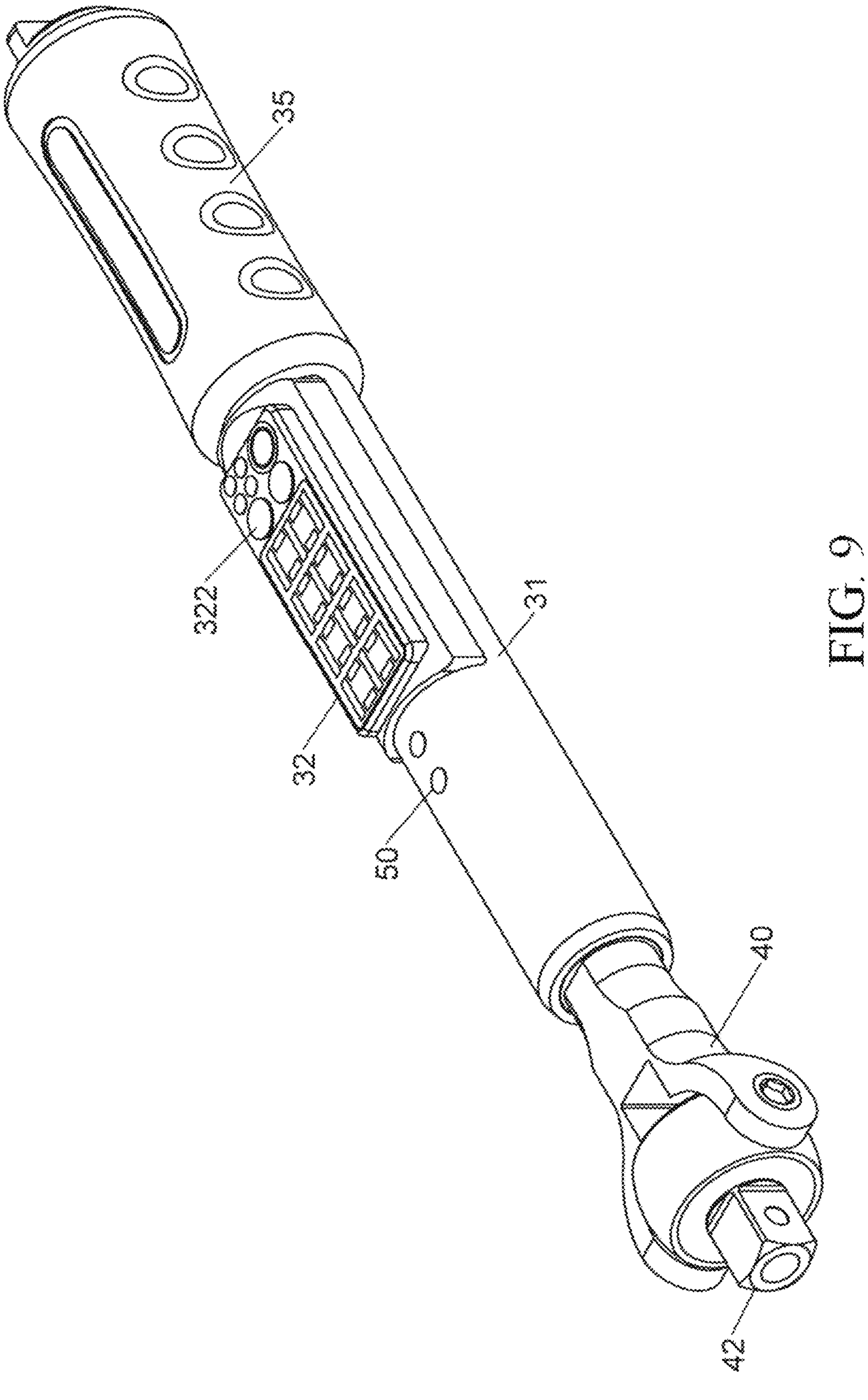
FIG. 9 is a schematic operational view of the torque structure as shown in FIG. 6.

Referring to FIG. 9 with reference to FIGS. 1-7, the driving portion 42 is rotated relative to the drive member 40 and is moved to the second position where the second axis 43 coincides with the first axis 14.

Figure 10:
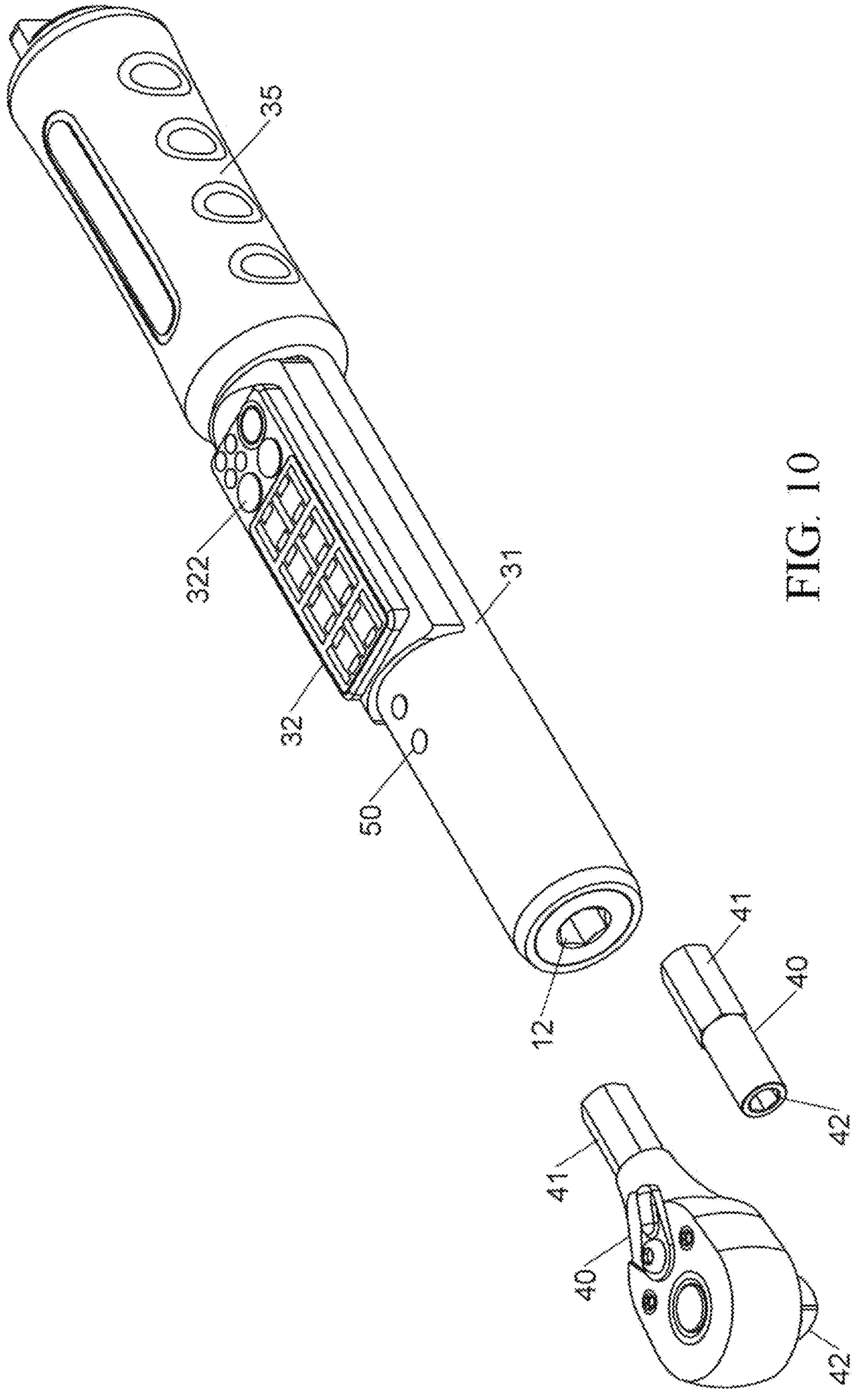
FIG. 10 is a partial exploded perspective view of a torque structure in accordance with the second preferred embodiment of the present invention.

Referring to FIG. 10, the driving portion 42 cannot be rotated relative to the drive member 40. Preferably, the drive member 40 is a ratchet mechanism provided with an operation knob to control normal and reverse rotation of t he driving portion 42. At this time, the second axis 43 is perpendicular to the first axis 14. Alternatively, the drive member 40 is a connector used to mount a screwdriver tip. At this time, the second axis 43 coincides with the first axis 14.

Figure 11:
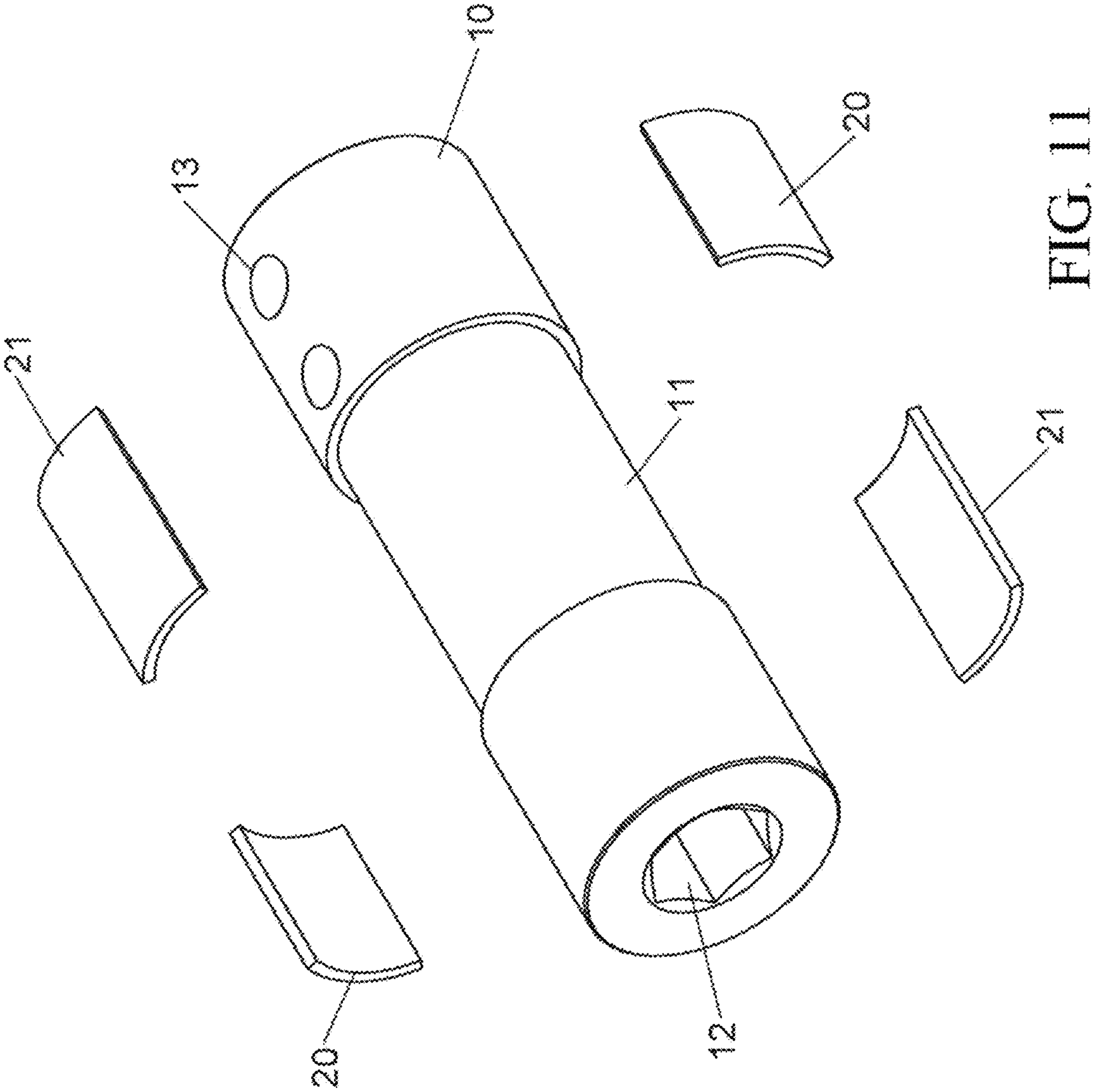
FIG. 11 is a partial exploded perspective view of a torque structure in accordance with the third preferred embodiment of the present invention.

Referring to FIG. 11, the torque structure comprises two first strain gauges 20 and two second strain gauges 21. The two first strain gauges 20 and the two second strain gauges 21 surround the first receiving groove 11 annularly and evenly. Thus, the two first strain gauges 20 and the two second strain gauges 21 are distributed on a top, a bottom, a left, and a right of the first body 10.

Figure 12:
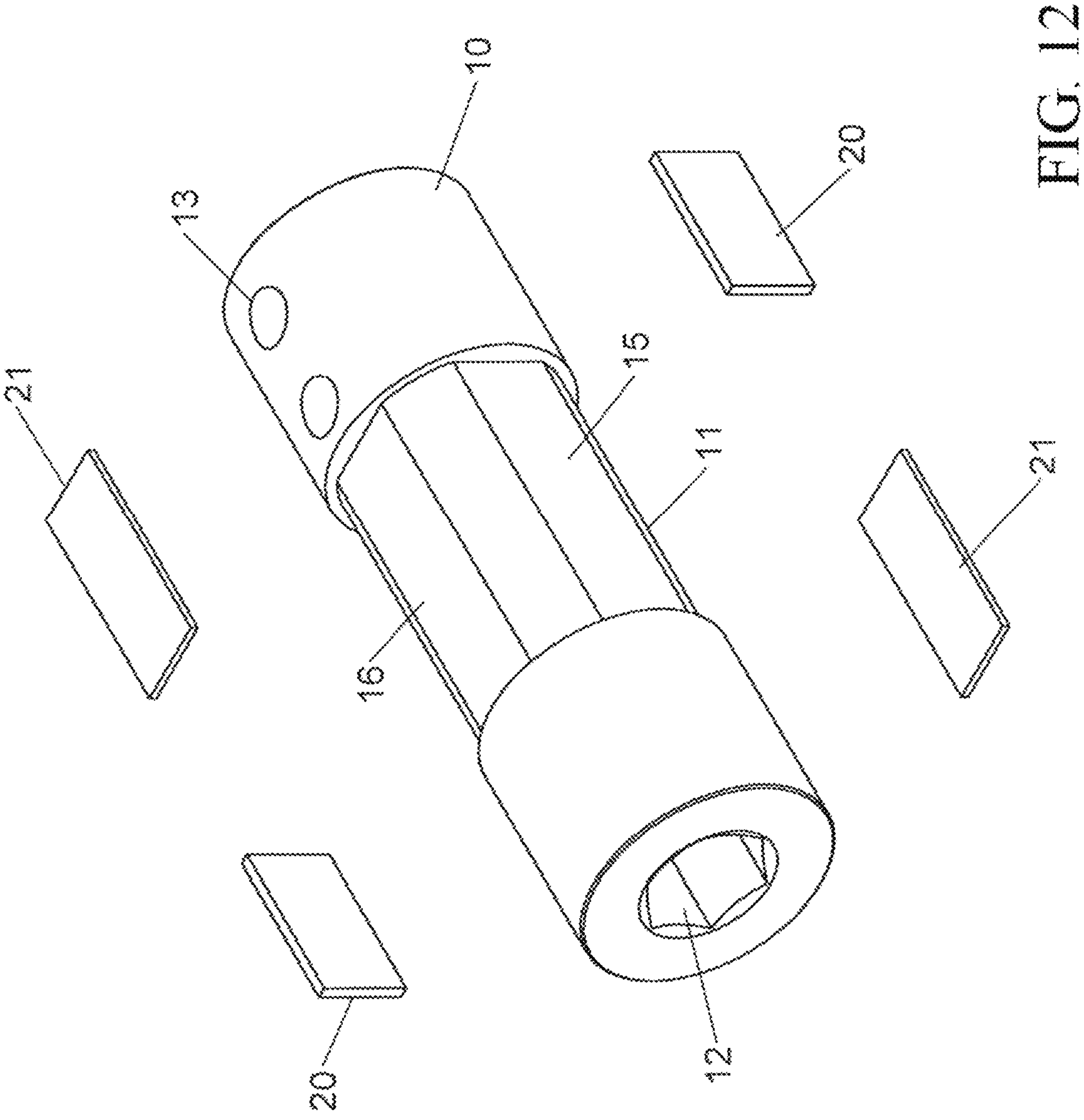
FIG. 12 is a partial exploded perspective view of a torque structure in accordance with the fourth preferred embodiment of the present invention.

Referring to FIG. 12, the first receiving groove 11 is provided with multiple first planes 15 and multiple second planes 16. The first planes 15 and the second planes 16 are distributed on the first receiving groove 11 annularly and alternatingly. The torque structure comprises multiple first strain gauges 20 and multiple second strain gauges 21. The first strain gauges 20 are mounted on the first planes 15 respectively. The second strain gauges 21 are mounted on the second planes 16 respectively. The first strain gauges 20 and the second strain gauges 21 have a shape corresponding to that of the first receiving groove 11.

Accordingly, the torque structure of the present invention has the following advantages.

Figure 6:
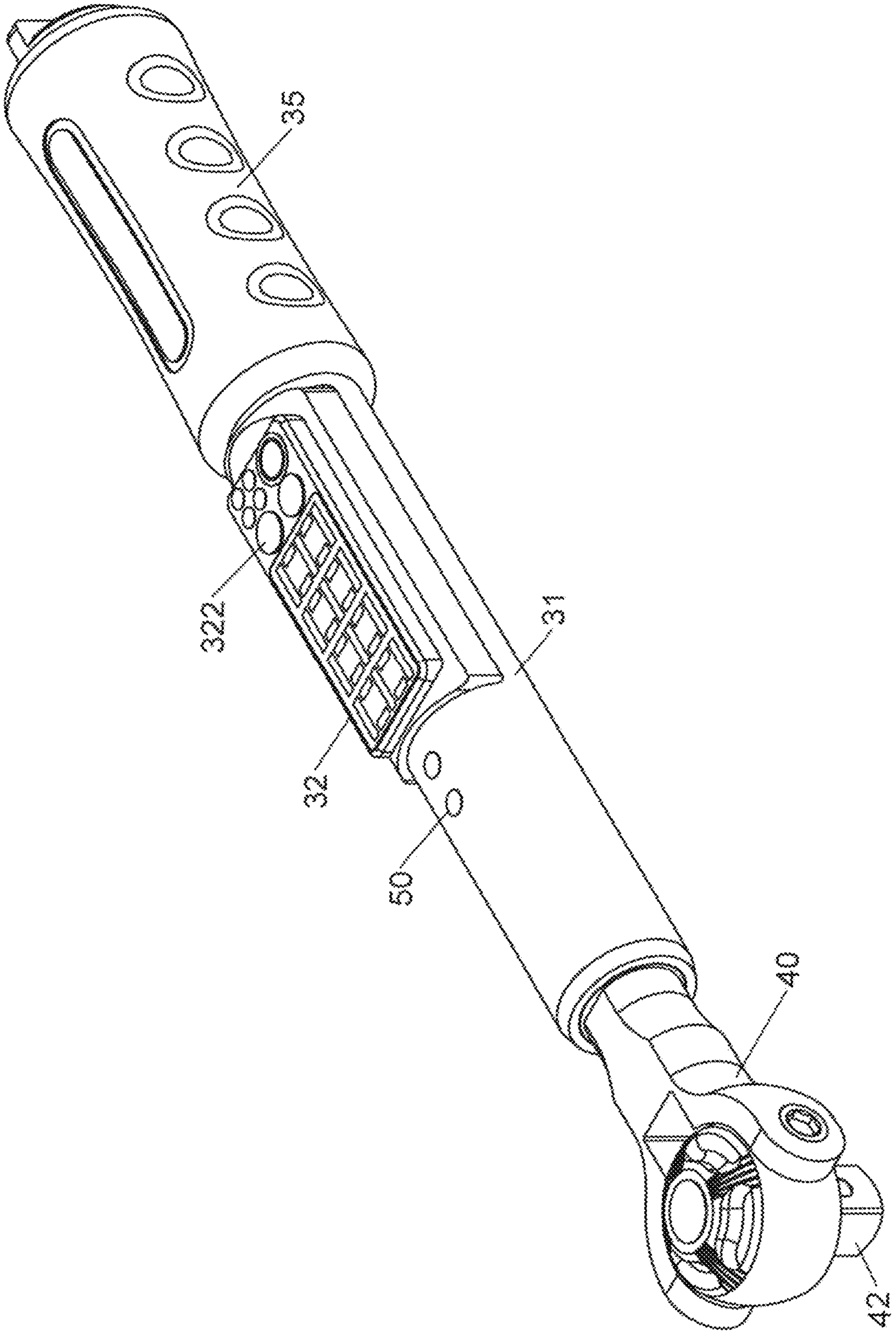
FIG. 6 is a perspective view of the torque structure in accordance with the preferred embodiment of the present invention.
Figure 7:
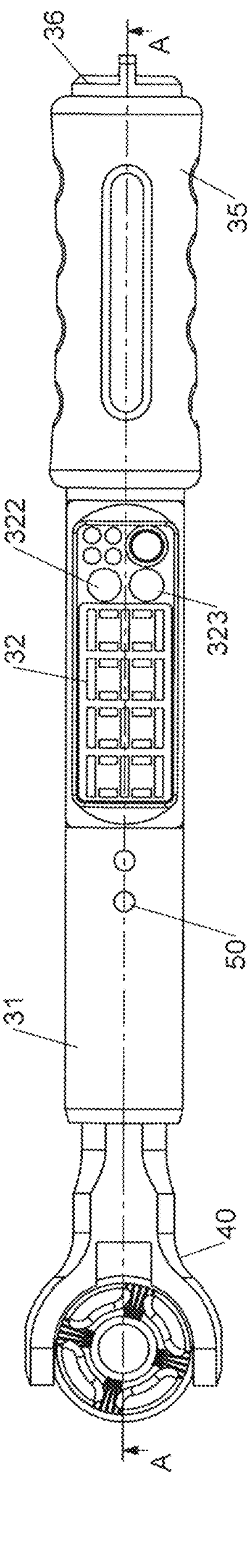
FIG. 7 is a top view of the torque structure as shown in FIG. 6.

1. The first receiving groove 11 accommodates the first strain gauge 20 and the second strain gauge 21. The first strain gauge 20 detects the bending strain of the first body 10. The second strain gauge 21 detects the torque deformation amount of the first body 10. Thus, the first strain gauge 20 and the second strain gauge 21 provides two different detecting functions to enhance the utility of the torque structure.
2. When the driving portion 42 is perpendicular to the drive member 40 as shown in FIG. 6 or when the driving portion 42 is in line with the drive member 40 as shown in FIG. 9, the torque structure can be used to detect the two different torque values, so that the user needs not to purchase a torque wrench and a torque screwdriver simultaneously for detecting two different torque values, thereby enhancing the versatility of the torque structure.
3. As shown in FIG. 10, when the drive member 40 is a ratchet mechanism, the second axis 43 is perpendicular to the first axis 14, and when the drive member 40 is a screwdriver connector, the second axis 43 coincides with the first axis 14. Thus, the torque value of the drive members 40 of two different types can be detected.
4. The first push button 322 turns on the first strain gauge 20 to detect the bending strain of the first body 10, and the second push button 323 turns on the second strain gauge 21 to detect the torque deformation amount of t he first body 10. The first push button 322 and the second push button 323 control the on/off state of the first strain gauge 20 and the second strain gauge 21 respectively. Thus, the user only needs to pushes the first push button 322 or t he second push button 323 to detect the torque value, thereby facilitating operation of the torque structure.
5. As shown in FIG. 4, the first push button 322 is located at the right side of the second virtual surface 142 and directed toward the first strain gauge 20, and the second push button 323 is located at the left side of the second virtual surface 142 and directed toward the second strain gauge 21, so that the user can easily switch the first push button 322 and the second push button 323 to detect two different torque values.
6. The torque structure selectively comprises multiple first strain gauges 20 and multiple second strain gauges 21 received in the first receiving groove 11 to detect the torque value exactly and precisely.
7. The appearance of the torque structure includes the second body 31, the indicator 32, and the drive member 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A torque structure comprising:

a first body, a first strain gauge, a second strain gauge, a second body unit, and multiple fastening members;

wherein:

the first body is recessed with a first receiving groove;

the first receiving groove is formed in an exterior of the first body and located at a middle position of the first body;

the first body is a circular rod;
the first receiving groove has an annular shape and has a diameter less than that of the first body;
the first body has a first end provided with a first mounting portion;
the first body has a second end provided with multiple first fastening portions;
the first receiving groove is disposed between the first mounting portion and the first fastening portions;
the first mounting portion and the first fastening portions are disposed at two ends of the first receiving groove;
the first body has an axis defining a first axis;
the first strain gauge is received in the first receiving groove to detect a bending strain in response to a bending force applied to the first body;
the bending strain of the first body detected by the first strain gauge is directed in a direction perpendicular to the first axis;
the second strain gauge is received in the first receiving groove to detect a torque deformation amount of the first body;
the torque deformation amount of the first body detected by the second strain gauge is directed in a direction in line with the first axis;
the bending strain of the first body detected by the first strain gauge and the torque deformation amount of the first body detected by the second strain gauge are different torque values;
the second strain gauge is perpendicular to the first strain gauge;
the second body unit includes a second body, an indicator, a housing, a power supply member, a grip, and a cover;
the first body, the first strain gauge, and the second strain gauge are received in the second body unit;
the first mounting portion is exposed from the second body;
the second body is a circular rod;
the second body is provided with a second receiving groove for receiving and securing the first body;
the second receiving groove is a circular hollow recess and penetrates the second body longitudinally;
the second body has a first end provided with a first opening, and the first body is received in the first opening;
the second body is provided with multiple second fastening portions aligning with the first fastening portions;
the second body has a second end provided with a second opening;
the second body is provided with a slot connected to the second receiving groove;
the slot is disposed between to the first opening and the second opening;
the second fastening portions are disposed between the first opening and the slot;
the indicator is mounted in the slot;
the indicator is provided with a switch for controlling on/off of the indicator;
the indicator is provided with a first push button and a second push button;
the first push button turns on/off the first strain gauge to detect the bending strain of the first body;
the second push button turns on/off the second strain gauge to detect the torque deformation amount of the first body;
the indicator is provided with multiple numbers to indicate values of the bending strain of the first body detected by the first strain gauge and values of the torque deformation amount of the first body detected by the second strain gauge;
the indicator is electrically connected with the first strain gauge;
the first strain gauge detects and transmits the bending strain of the first body to the indicator so that the indicator indicates the values of the bending strain of the first body;
when a preset value of the bending strain of the first body is reached, the indicator emits a warning sound;
the indicator is electrically connected with the second strain gauge;
the second strain gauge detects and transmits the torque deformation amount of the first body to the indicator so that the indicator indicates the values of the torque deformation amount of the first body;
when a preset value of the torque deformation amount of the first body is reached, the indicator emits a warning sound;
the housing is received in the second receiving groove and is close to the second opening;
the power supply member is received in the housing and can be removed from the housing;
the power supply member is electrically connected with and provides an electric power to the indicator;
the power supply member is a disposable battery or a chargeable battery;
the grip is mounted on the second body;
the grip is distant from the first opening;
the grip is a hollow cylinder and has a periphery provided with multiple dimples to provide a non-slip effect;
the cover is mounted on the second opening;
the housing and the power supply member are restricted by the cover and will not be detached from the second body;
the cover is provided with an external thread screwed into the second opening;
the power supply member is removed from the second body after the cover is detached from the second body;
the first axis defines a first virtual surface that is situated at an XY plane and defines a second virtual surface that is situated at a YZ plane;
the first virtual surface is perpendicular to the second virtual surface;
the first strain gauge coincides with the first virtual surface;
the second strain gauge coincides with the second virtual surface;
the first push button is located at a right side of the second virtual surface;
the second push button is located at a left side of the second virtual surface;
the first push button is directed toward the first strain gauge;
the second push button is directed toward the second strain gauge;
the fastening members secure the first body and the second body unit;
the fastening members extend through the second fastening portions and the first fastening portions; and
the fastening members have a number equal to that of the first fastening portions and the second fastening portions.

2. The torque structure as claimed in claim 1, wherein the first mounting portion is a hexagonal, polygonal or non-circular recess.

3. The torque structure as claimed in claim 1, wherein:
the first body has four first fastening portions arranged symmetrically;
each of the first fastening portions is a circular hole or screw hole;
any two of the first fastening portions are connected and penetrate the first body;
the second body has four second fastening portions;
each of the second fastening portions is a circular hole and is close to the first opening; and
the slot has a rectangular shape.

4. The torque structure as claimed in claim 1, further comprising:
a drive member having a first end provided with a second mounting portion mounted on the first mounting portion;
wherein:
the second mounting portion has a shape mating with that of the first mounting portion;
the second mounting portion is a hexagonal head;
the drive member has a second end provided with a driving portion protruding from the first body;
the driving portion is a square head and has an axis defining a second axis; and
the driving portion is rotatable relative to the drive member and movable between a first position where the second axis is perpendicular to the first axis and intersect the first axis at one point and a second position where the second axis coincides with the first axis.

5. The torque structure as claimed in claim 4, wherein:
the driving portion is rotated relative to the drive member and is moved to the first position where the second axis is perpendicular to the first axis, so that the first push button turns on the first strain gauge to detect the bending strain of the first body; and
the driving portion is further rotated relative to the drive member and is moved to the second position where the second axis coincides with the first axis, so that the second push button turns on the second strain gauge to detect the torque deformation amount of the first body.

6. The torque structure as claimed in claim 1, wherein:
the torque structure comprises two first strain gauges and two second strain gauges;
the two first strain gauges and the two second strain gauges surround the first receiving groove annularly and evenly; and
the two first strain gauges and the two second strain gauges are distributed on a top, a bottom, a left, and a right of the first body.

7. The torque structure as claimed in claim 1, wherein:
the first receiving groove is provided with multiple first planes and multiple second planes;
the first planes and the second planes are distributed on the first receiving groove annularly and alternatingly;
the torque structure comprises multiple first strain gauges and multiple second strain gauges;
the first strain gauges are mounted on the first planes respectively; and the second strain gauges are mounted on the second planes respectively.

* * * * *